(12) United States Patent
Torlai et al.

(10) Patent No.: US 11,261,062 B2
(45) Date of Patent: Mar. 1, 2022

(54) MODULAR SHEAVE UNIT

(71) Applicant: Otis Elevator Company, Farmington, CT (US)

(72) Inventors: David R. Torlai, Torrington, CT (US); Jun Ma, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 264 days.

(21) Appl. No.: 16/403,216

(22) Filed: May 3, 2019

(65) Prior Publication Data
US 2020/0346899 A1   Nov. 5, 2020

(51) Int. Cl.
*B66B 15/02*   (2006.01)
*F16H 55/36*   (2006.01)
*F16H 57/00*   (2012.01)
*B66B 15/06*   (2006.01)

(52) U.S. Cl.
CPC ............ *B66B 15/02* (2013.01); *B66B 15/06* (2013.01); *F16H 55/36* (2013.01); *F16H 57/0031* (2013.01)

(58) Field of Classification Search
CPC ................................ B66B 15/04; F16H 55/36
See application file for complete search history.

(56) References Cited

U.S. PATENT DOCUMENTS

| 2,459,290 A * | 1/1949 | Rozner | F16C 19/49 |
| | | | 254/404 |
| 3,279,762 A * | 10/1966 | Bruns | B66B 15/04 |
| | | | 254/266 |
| 4,309,023 A * | 1/1982 | Plumettaz | B66D 1/54 |
| | | | 182/36 |
| 6,896,415 B2 | 5/2005 | Ishiwada | |
| 9,206,838 B2 | 12/2015 | Mola | |
| 9,416,863 B2 | 8/2016 | Schaefer | |
| 9,506,538 B2 | 11/2016 | Hedman | |
| 9,702,399 B2 | 7/2017 | Arnault | |
| 10,246,303 B2 * | 4/2019 | Lampinen | B66B 9/00 |
| 2010/0284642 A1 | 11/2010 | Mineno | |
| 2016/0236909 A1 | 8/2016 | Lampinen | |
| 2017/0349410 A1 | 12/2017 | Wem | |
| 2017/0355571 A1 | 12/2017 | Ferreira | |

(Continued)

FOREIGN PATENT DOCUMENTS

| CN | 101126424 A | 2/2008 |
| CN | 201961925 U | 9/2011 |

(Continued)

OTHER PUBLICATIONS

European Search Report; Application No. 19219665.7-1001; dated Jul. 30, 2020; 7 pages.

(Continued)

*Primary Examiner* — Diem M Tran
(74) *Attorney, Agent, or Firm* — Cantor Colburn LLP

(57) ABSTRACT

Disclosed is a modular sheave unit including: a bearing that includes an outer race, an inner race and one or more rolling elements therebetween; and a sleeve that includes one or both of: an outer sleeve axially surrounding the outer race, the outer sleeve including an outer surface defining a groove, the groove configured to receive a belt; and an inner sleeve axially surrounded by the inner race and disposed between the inner race and a mandrel.

18 Claims, 4 Drawing Sheets

(56) References Cited

U.S. PATENT DOCUMENTS

| | | |
|---|---|---|
| 2018/0223982 A1 | 8/2018 | Nakao |
| 2019/0047826 A1 | 2/2019 | Lee et al. |
| 2019/0106295 A1* | 4/2019 | Salmi ..................... B66B 15/02 |
| 2019/0263631 A1* | 8/2019 | Duvall .................... B66B 15/04 |

FOREIGN PATENT DOCUMENTS

| | | |
|---|---|---|
| CN | 103171946 A | 6/2013 |
| CN | 203308892 U | 11/2013 |
| CN | 103171946 B | 5/2015 |
| CN | 207500438 U | 6/2015 |
| CN | 204512360 U | 7/2015 |
| CN | 205687353 U | 11/2016 |
| CN | 205937733 U | 2/2017 |
| CN | 106573761 A | 4/2017 |
| CN | 106744440 A | 5/2017 |
| CN | 109384123 A | 2/2019 |
| EP | 1967766 B1 | 5/2010 |
| EP | 2687737 A1 | 1/2014 |
| EP | 2324138 B1 | 12/2018 |
| JP | 2010101358 A | 5/2010 |
| WO | 2016019135 A1 | 2/2016 |

OTHER PUBLICATIONS

Chinese Office Action Issued in Chinese Application No. 201911408209.0 dated Jun. 30, 2021; 13 Pages.

* cited by examiner

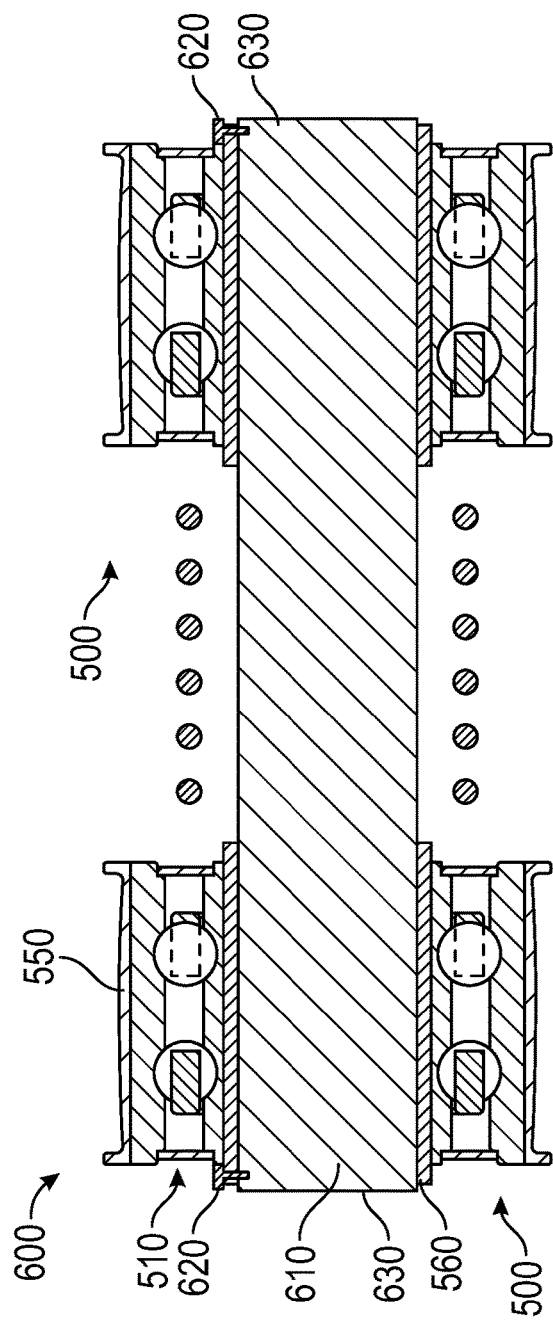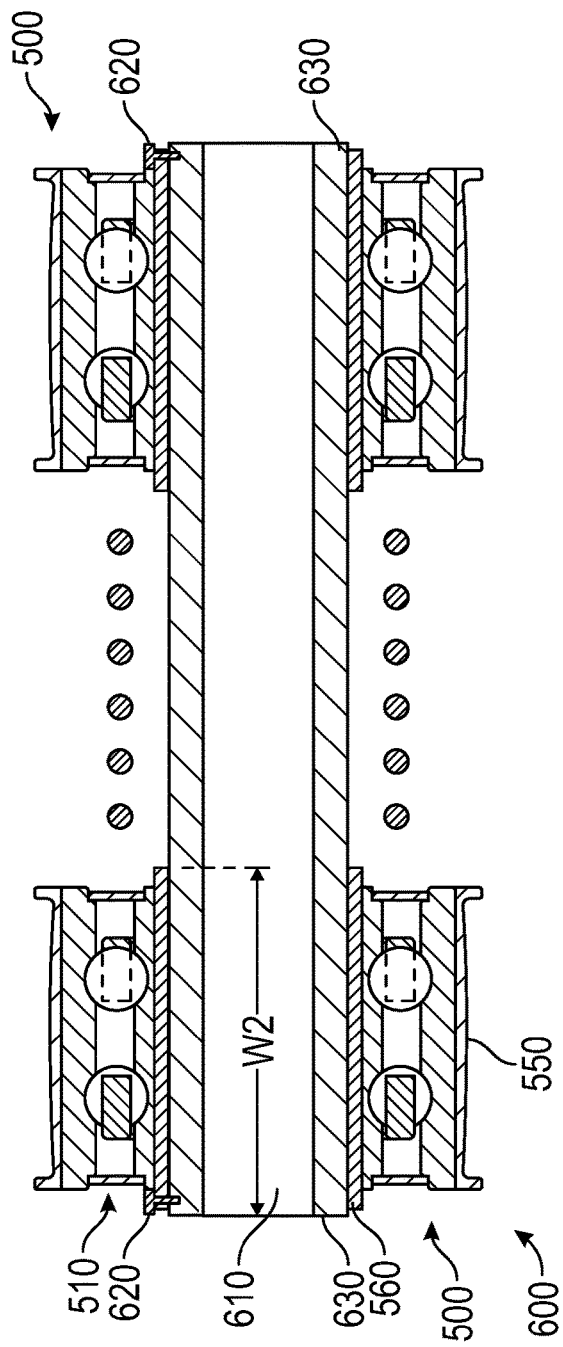

MODULAR SHEAVE UNIT

BACKGROUND

The disclosure relates generally to sheave assemblies for guiding belts that move elevator cars, and more specifically to modular sheave units of a sheave assembly for an elevator car.

Commercial elevator systems may use belt sheaves as part of driving system to operate an elevator car. Drive sheaves are used to both drive and guide belts. Idler sheaves may be located intermediate the drive sheave and the elevator car and may be used to maintain proper alignment and tension of belts during operation. Idler sheaves may have belt receiving grooves with a profile contours that constrict sideway motion of belts to ensure alignment. Manufacturing of idler sheaves with contoured outer surfaces may be costly.

BRIEF DESCRIPTION

Disclosed is a modular sheave unit comprising: a bearing that includes an outer race, an inner race and one or more rolling elements therebetween; and a sleeve that comprises one or both of: an outer sleeve axially surrounding the outer race, the outer sleeve including an outer surface defining a groove, the groove configured to receive a belt; and an inner sleeve axially surrounded by the inner race and disposed between the inner race and a mandrel.

In addition to one or more of the above disclosed features or as an alternate the sleeve comprises the outer sleeve; and the inner race includes the inner surface configured to be positioned against a mandrel.

In addition to one or more of the above disclosed features or as an alternate the sleeve comprises the inner sleeve; and the outer race includes the outer surface that defines the groove.

In addition to one or more of the above disclosed features or as an alternate the sleeve comprises both the outer sleeve and the inner sleeve.

In addition to one or more of the above disclosed features or as an alternate the sleeve is formed from one of aluminum, plastic, thermoplastic polyurethane and rubber.

In addition to one or more of the above disclosed features or as an alternate the sleeve comprises the outer sleeve and the inner sleeve; the outer sleeve is formed from one of aluminum, plastic, thermoplastic polyurethane and rubber; and the inner sleeve is formed from another of aluminum, plastic, thermoplastic polyurethane and rubber.

In addition to one or more of the above disclosed features or as an alternate the bearing is a ball bearing.

Further disclosed is an elevator sheave system comprising: a plurality of the modular sheave units arranged side by side along a mandrel, wherein the plurality of the modular sheave units include one or more of the above disclosed features. The system further includes fastening devices located on opposing ends of the mandrel to secure the modular sheave units to the mandrel.

Further disclosed is a method of configuring a modular sheave unit, comprising arranging, a plurality of modular sheave units, side by side along a mandrel, wherein the plurality of the modular sheave units include one or more of the above disclosed features. The method further includes arranging a fastening device on opposing ends of the mandrel to secure the plurality of modular sheave units to the mandrel.

BRIEF DESCRIPTION OF THE DRAWINGS

The following descriptions should not be considered limiting in any way. With reference to the accompanying drawings, like elements are numbered alike:

FIGS. 5a-5b illustrate an elevator sheave system according to disclosed embodiments.

DETAILED DESCRIPTION

A detailed description of one or more embodiments of the disclosed apparatus and method are presented herein by way of exemplification and not limitation with reference to the Figures.

Figure 1:
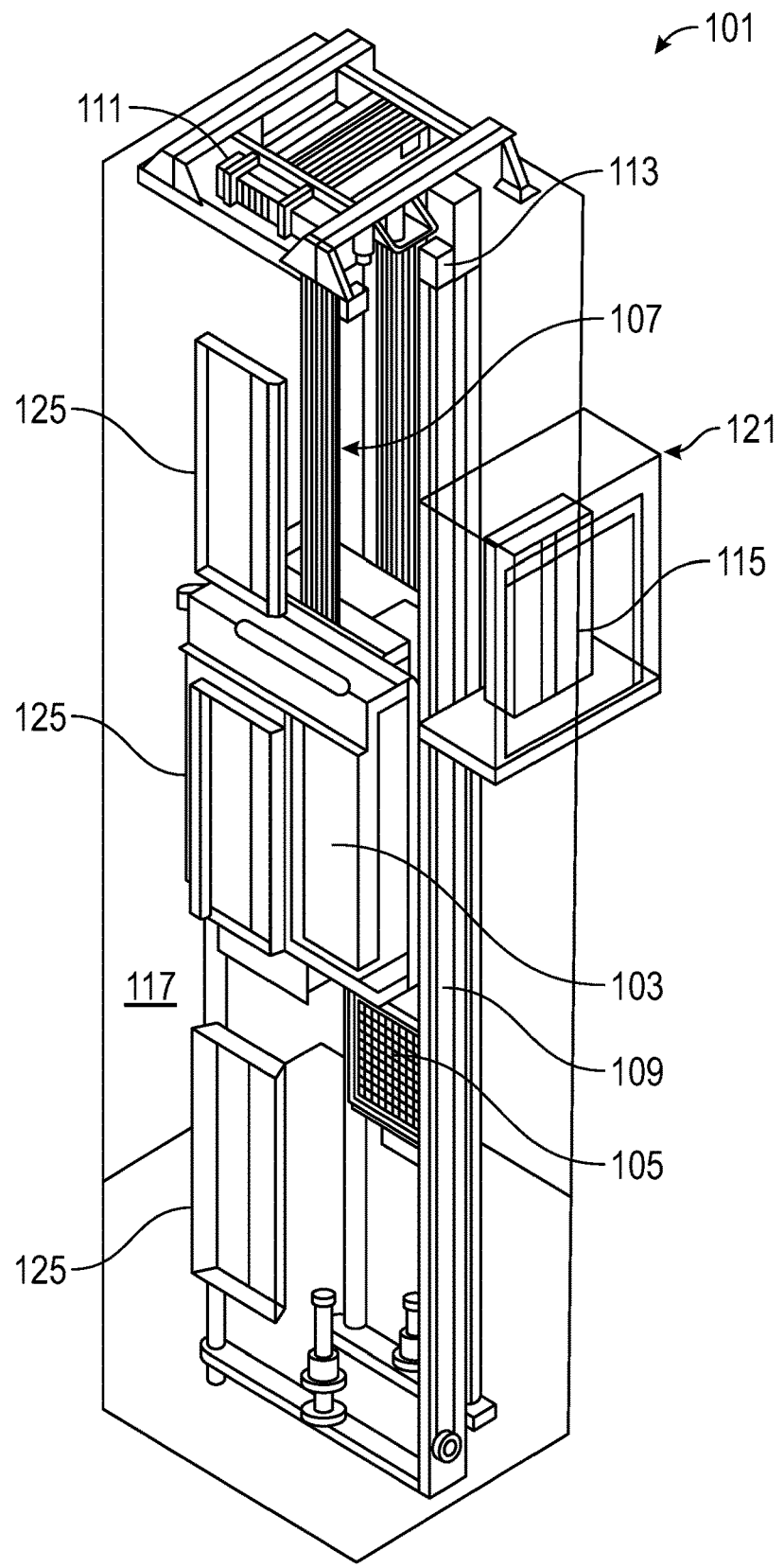
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. The tension member 107 engages the machine 111, which is part of an overhead structure of the elevator system 101. The machine 111 is configured to control movement between the elevator car 103 and the counterweight 105. The controller 115 is located, as shown, in a controller room 121 of the elevator shaft 117 and is configured to control the operation of the elevator system 101, and particularly the elevator car 103, for example, to stop at one or more landings 125.

Figure 3:
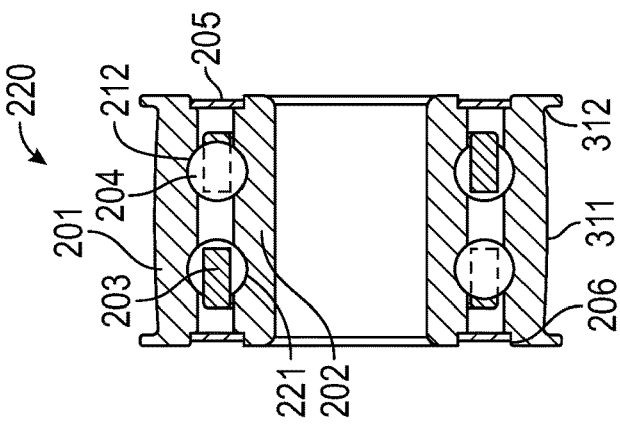
FIG. 3 is an illustration of a modular sheave unit of the system of FIG. 2.
Figure 2:
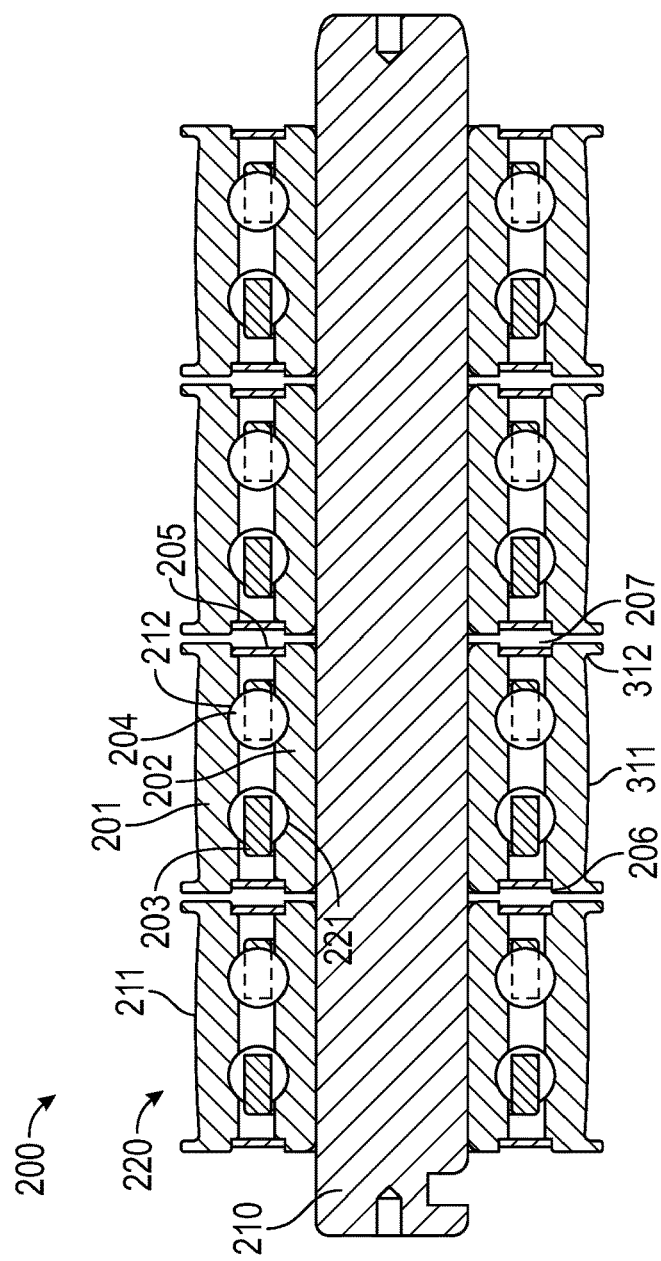
FIG. 2 is an illustration of an elevator sheave system, configured with modular sheave units, and which may be configured with modular sheave units according to disclosed embodiments.

In FIGS. 2 and 3, an elevator sheave system 200 and modular sheave units 220 thereof are illustrated, which may employ various features of the disclosed embodiments, and wherein one modular sheave unit 220 is illustrated in FIG. 3. The modular sheave units 220 may each include an outer annulus 201, an inner annulus 202, a fixing frame 203, two annular rows of ball bodies 204 and seal rings 205. The outer annulus 201 is provided with a belt receiving groove 211 on its radial outer surface to support, and guide, a belt. The belt receiving groove 211 may have a belt seating portion 311 which may be an axial center portion having an arcuate convex curvature forming a belt seat and opposing flanged side walls 312 for centering and providing transition fit with a belt. This configuration reduces the friction against a belt disposed against the belt receiving groove 211 and increase a usage life of the modular sheave unit 220.

The two rows of ball bodies 204 may be respectively seated on axial left (distal) and right (proximate) sides of radial inner ball seating grooves 212 of the outer annulus 201 and axial left and right sides of radial outer ball seating grooves 221 of the inner annulus 202. The fixing frame 203 may secure the rows of ball bodies 204 between the outer annulus 201 and the inner annulus 202. As can be appreciated, the outer annulus 201 and inner annulus 202 are configured to be respective outer and inner races of a ball bearing structure formed by the sheave system 200. The axial end faces of the outer annulus 201 and the inner annulus 202 may be provided with radially opposing seal ring grooves 206. The seal ring 205 may be provided in the seal ring grooves 206 between the outer annulus 201 and the inner annulus 202.

The sheave system 200 includes a mandrel 210 and a plurality of the modular sheave units 220 arranged axially side by side along the mandrel 210. The modular sheave unit 220 and the outer surface of the mandrel 210 may form a transition fit. Axial end faces of the inner annulus 202 of axially adjacent modular sheave units 220 may be axially pressed against each other. Axial end faces of the outer portion 201 of axially adjacent modular sheave units 220 may be axially spaced from each other to allow relative rotation therebetween. Abrasion resistance paddings 207 may be arranged between the axial end faces of the inner annulus 202 of axially adjacent modular sheave units 220. This configuration reduces friction between the adjacent modular sheave units 220 and further increases usage life of the modular sheave units 220. Jump rings may be used on the axial ends of the mandrel 210 to secure the modular sheave units 220 to the mandrel 210.

Various issues may result with the above disclosed modular sheave units. Manufacturing modular sheave units as disclosed above may result in significant costs. Moving surfaces may need to be plated. If damaged, such units may be difficult to repair and replace.

Figure 4C:
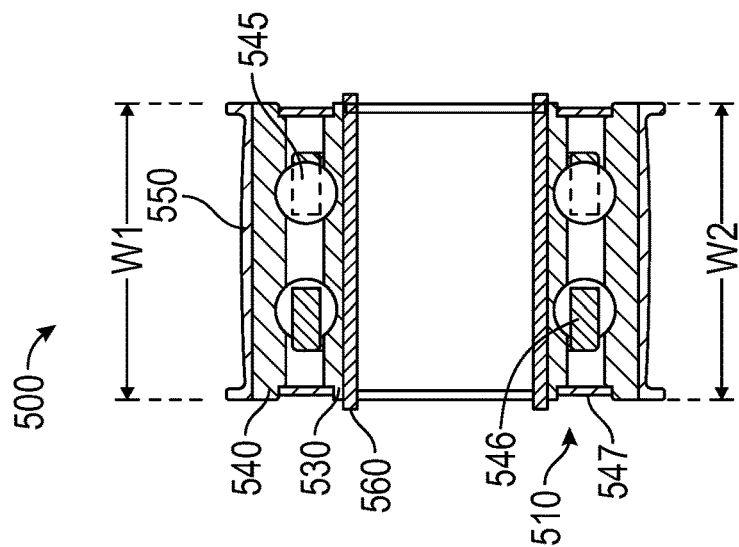
FIGS. 4a-4c illustrate modular sheave units according to disclosed embodiments.
Figure 4B:
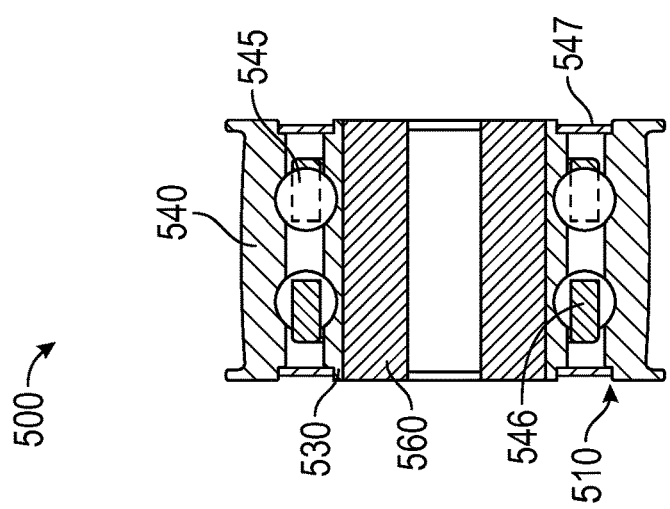
Figure 4A:
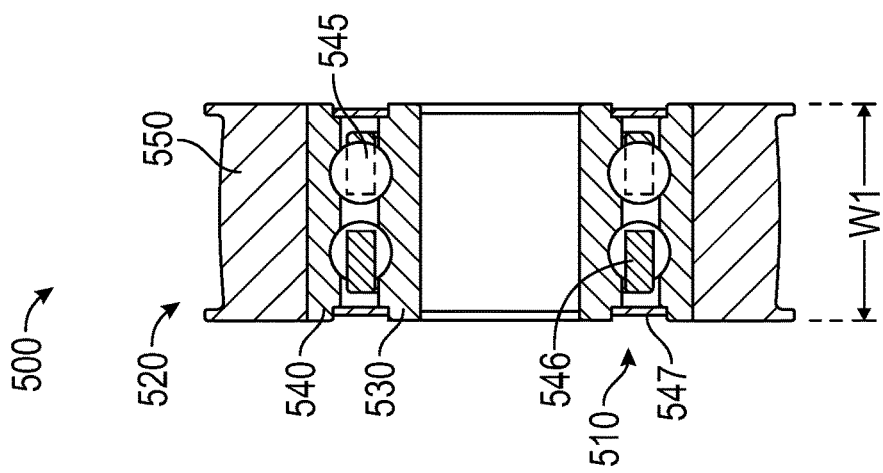

Turning now to FIGS. 4a-4c, modular sheave units 500 are disclosed according to one or more embodiments, wherein each of FIG. 4a-4c illustrates a single module sheave unit 500. The modular sheave units 500 may each include a bearing 510 that spans a width W1, which is an axial length relative to an axis of rotation for the bearing 510. The width W1 may be the same as that of a belt receiving groove 520 of the modular sheave units 500, wherein the belt receiving groove 520 has the same features of the belt receiving groove 211 identified above.

The bearing 510 may be a ball bearing with an inner race 530, an outer race 540, rolling elements 545, fixing elements 546, and seal rings 547, manufactured from materials that are strong enough for the bearing operation. The ball bearing 510 may be, for example, an off-the-shelf product and/or a product having a generalized design that is usable across various elevator sheave configurations and platforms. The use of a generic and interchangeable ball bearing 510 may reduce customization requirements as compared with modular sheave units 220 usable for only specific configurations or platforms.

A radial outer sleeve (outer sleeve) 550 (FIG. 4a), which may be an outer annulus, may be placed over the bearing outer race 540. The outer sleeve 550 may have the same width W1 as the bearing 510 and may comprise one or more corrosion resistant, energy absorption materials comprising aluminum, plastic, thermoplastic polyurethane (TPU) and rubber. By including an outer sleeve 550 with a generic ball bearing 510, the modular sheave units 500 may be customized without the need for additional surface treatments, such as plating, to the bearing 510.

A radial inner sleeve (inner sleeve) 560, which may be an inner annulus, may utilized alternatively (FIG. 4b) or in addition (FIG. 4c) to the outer sleeve 550, and may be placed inside the bearing inner race 530. In embodiments with an inner sleeve 560 and without the outer sleeve 550 (FIG. 4b), the outer race 540 of the bearing 510 may be formed with the belt receiving groove 520. The inner sleeve 560 may comprise the same or different energy absorption material as the outer sleeve 550. Both the outer sleeve 550 and the inner sleeve 560 may be molded or casted to minimize machining. Thus, the modular sheave 500 units may be individually and inexpensively replaced when damaged, so that it is easier to maintain and reduce repairing costs.

Illustrated in FIG. 4c is an embodiment in which the inner sleeve 560 has a width W2 that is larger than the width W1 of the bearing 510 and the outer sleeve 550. This provides for axial spacing between adjacent modular sheave units 500, as further illustrated in FIGS. 5a-5b. Turning now to FIGS. 5a-5b, a plurality of the modular sheave units 500 are illustrate in a sheave system 600. The sheave system 600 includes a mandrel 610 that may be similar in configuration to the mandrel 210 disclosed above. The modular sheave units 500 may be configured against the mandrel 610 similarly to the configuration between the modular sheave units 220 and the mandrel 210 disclosed above. In addition, set screws 620 or other fastening devices may be on axial ends 630 of the mandrel 610 to secure the modular sheave units 500 against the mandrel 610. As indicated with FIG. 4c, the modular sheave units 500 may have respective inner sleeves 560 with widths W2 that are larger than the widths W1 for the respective outer sleeves 550 and bearings 510. Thus, when the inner sleeves 560 of adjacent pairs of the modular shave units 500 are pressed against each other there is a separation between the bearings 510 and the outer sleeves 550. This configuration enables relative rotation between adjacent ones of the modular sheave units 500. Abrasion resistance paddings, however, may not need to be used between adjacent modular sheave units 500 because the inner sleeves 550 may provide the same function of reducing the occurrence of abrasion between the adjacent modular sheave units 500.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A modular sheave unit configured for being arranged on a mandrel of an elevator sheave system, the modular sheave unit comprising:

a bearing that includes an outer race, an inner race and a plurality of rolling elements therebetween, wherein the outer and inner races extend to opposite axial ends of the modular sheave and the rolling elements are respectively seated at axial distal and proximate sides of the outer and inner races; and an outer sleeve axially surrounding the outer race, the outer sleeve including an outer sleeve surface defining a belt receiving groove, the belt receiving groove having a belt seating portion located at an axial center portion of the outer sleeve, having an arcuate convex curvature forming a belt seat and opposing flanged side walls for centering and providing transition fit with a belt.

2. The modular sleeve unit of claim 1, wherein:
the inner race includes an inner race surface configured to be positioned against the mandrel.

3. The modular sheave unit of claim 1, wherein:
an inner sleeve axially surrounded by the inner race and configured to be disposed between the inner race and the mandrel.

4. The modular sheave unit of claim 3, wherein:
the outer sleeve is formed from one of aluminum, plastic, thermoplastic polyurethane and rubber; and
the inner sleeve is formed from another of aluminum, plastic, thermoplastic polyurethane and rubber.

5. The modular sheave unit of claim 1, wherein the outer sleeve is formed from one of aluminum, plastic, thermoplastic polyurethane and rubber.

6. The modular sheave unit of claim 1, wherein the bearing is a ball bearing.

7. An elevator sheave system comprising:
a plurality of modular sheave units arranged side by side along a mandrel; and
each of the modular sheave units including:
a bearing that includes an outer race, an inner race and a plurality of rolling elements therebetween, wherein the outer and inner races extend to opposite axial ends of the modular sheave and the rolling elements are respectively seated at axial distal and proximate sides of the outer and inner races; and
an outer sleeve axially surrounding the outer race, the outer sleeve including an outer sleeve surface defining a belt receiving groove, the belt receiving groove having a belt seating portion located at an axial center portion of the outer sleeve, having an arcuate convex curvature forming a belt seat and opposing flanged side walls for centering and providing transition fit with a belt.

8. The system of claim 7, wherein:
an inner race includes the inner race surface positioned against the mandrel; and
adjacent pairs of the modular sheave units are configured so that axially facing surfaces of the outer sleeve are spaced from one another.

9. The system of claim 7, wherein:
an inner sleeve axially surrounded by the inner race and disposed between the inner race and the mandrel; and
adjacent pairs of the modular sheave units are configured so that axially facing surfaces the inner sleeve are pressed against one another.

10. The system of claim 9, wherein:
the outer sleeve is formed from one of aluminum, plastic, thermoplastic polyurethane and rubber; and
the inner sleeve is formed from another of aluminum, plastic, thermoplastic polyurethane and rubber.

11. The system of claim 7, wherein the outer sleeve is formed from one of aluminum, plastic, thermoplastic polyurethane and rubber.

12. The system of claim 7, wherein the bearing is a ball bearing.

13. The system of claim 7, including:
fastening devices located on opposing ends of the mandrel to secure the plurality of modular sheave units to the mandrel.

14. A method of configuring a modular sheave unit, comprising:
arranging, a plurality of modular sheave units, side by side along a mandrel, each of the modular sheave units including:
a bearing that includes an outer race, an inner race and a plurality of rolling elements therebetween, wherein the outer and inner races extend to opposite axial ends of the modular sheave and the rolling elements and respectively seated at axial distal and proximate sides of the outer and inner races; and
an outer sleeve axially surrounding the outer race, the outer sleeve including an outer sleeve surface defining a belt receiving groove, the belt receiving groove having a belt seating portion located at an axial center portion of the outer sleeve, having an arcuate convex curvature forming a belt seat and opposing flanged side walls for centering and providing transition fit with a belt.

15. The method of claim 14, wherein:
the inner race includes an inner race surface positioned against the mandrel; and
adjacent pairs of the modular sheave units are configured so that axially facing surfaces of the outer sleeve of are spaced from one another.

16. The method of claim 14, wherein:
an inner sleeve axially surrounded by the inner race and disposed between the inner race and the mandrel; and
adjacent pairs of the modular sheave units are configured so that axially facing surfaces of the inner sleeve are pressed against one another.

17. The method of claim 16, wherein:
adjacent pairs of the modular sheave units are arranged so that:
axially facing surfaces of the inner sleeve are pressed against one another; and
axially facing surfaces of the outer sleeve are spaced from one another.

18. The method of claim 14, comprising:
arranging a fastening device on opposing ends of the mandrel to secure the plurality of modular sheave units to the mandrel.

* * * * *